United States Patent
Grenager et al.

(10) Patent No.: US 11,823,237 B2
(45) Date of Patent: *Nov. 21, 2023

(54) DISPLAYING WEB PAGE ADVERTISEMENTS IN ONLINE VIDEO PLAYERS

(71) Applicant: ADAP.TV, INC., San Mateo, CA (US)

(72) Inventors: Trond Erling Grenager, San Francisco, CA (US); Daniel Louis Klein, Alameda, CA (US); Amir Ashkenazi, Los Altos, CA (US)

(73) Assignee: ADAP.TV, INC., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/524,394

(22) Filed: Nov. 11, 2021

(65) Prior Publication Data

US 2022/0067796 A1   Mar. 3, 2022

Related U.S. Application Data

(63) Continuation of application No. 16/408,254, filed on May 9, 2019, now Pat. No. 11,205,202, which is a
(Continued)

(51) Int. Cl.
*G06Q 30/02* (2023.01)
*G06Q 30/0241* (2023.01)

(52) U.S. Cl.
CPC ................. *G06Q 30/0277* (2013.01)

(58) Field of Classification Search
CPC .................................................. G06Q 30/0277
(Continued)

(56) References Cited

U.S. PATENT DOCUMENTS

2004/0015398 A1   1/2004 Hayward
2005/0114430 A1*  5/2005 Zheng ................... G06Q 30/02
                                                              709/200
(Continued)

OTHER PUBLICATIONS

Helft, Miguel, Google Aims to Make YouTube Profitable With Ads, dated Aug. 22, 2007 and downloaded Jun. 30, 2017 from http://www.nytimes.com/2007/08/22/technology/22google.html (Year: 2007).*
(Continued)

*Primary Examiner* — Scott D Gartland
(74) *Attorney, Agent, or Firm* — Bookoff McAndrews, PLLC

(57) ABSTRACT

Many conventional advertisements designed for display as part of a web page executed by a web browser are not suitable for display in an online video player that, though included in a web page, is executed by a multimedia platform. Such conventional advertisements are referred to herein as web page advertisements. A system display a web page advertisement in the frame of such an online video player by determining characteristics of the video player in the context of the multimedia platform and converting those characteristics into a context compatible with the web browser. The system can also include a virtual web browser that executes either on the multimedia platform on a server device that is communicatively coupled to the multimedia platform. The system can also include an ad tag translator that executes either on the multimedia platform on a server device that is communicatively coupled to the multimedia platform.

20 Claims, 6 Drawing Sheets

Related U.S. Application Data continuation of application No. 12/491,191, filed on Jun. 24, 2009, now Pat. No. 10,332,157.

(60) Provisional application No. 61/075,716, filed on Jun. 25, 2008.

(58) Field of Classification Search
USPC ........................................................ 705/14.73
See application file for complete search history.

(56) References Cited

U.S. PATENT DOCUMENTS

| | | | |
|---|---|---|---|
| 2007/0157086 A1 | 7/2007 | Drey | |
| 2008/0077952 A1* | 3/2008 | St. Jean | H04N 21/812 725/32 |
| 2008/0109844 A1* | 5/2008 | Baldeschwieler | H04N 21/222 348/E7.071 |
| 2008/0288983 A1* | 11/2008 | Johnson | H04N 21/812 725/46 |
| 2008/0320512 A1* | 12/2008 | Knight | H04N 21/4782 725/32 |

OTHER PUBLICATIONS

Collins, Shawn, YouTube Overlay Ads, dated Aug. 22, 2007, as evidenced by the sequence of screenshots attached as Collins—YouTube Screenshots Aug. 22, 2007 downloaded from https://www.youtube.com/watch?v=ZWFE9UDCPEE on Jun. 29, 2017 (Year: 2007).*

Hadlock, Kris, External Communications with Flash 8: How to Use the ExternalInterface, AdobePress, dated Mar. 24, 2006, downloaded from https://www.adobepress.com/articles/article.asp?p=457503&seqNum=5 on Feb. 22, 2021 (Year: 2006).*

Macromedia Flash ActionScript 2.0 Language Reference, First Edition and Copyrights indicating 2005, downloaded from http://homepage.divms.uiowa.edu/~slonnegr/flash/ActionScript2Reference.pdf on Feb. 22, 2021 (Year: 2005).*

Helft, Miguel, Google Aims to Make YouTube Profitable With Ads, dated Aug. 22, 2007 and downloaded Jun. 30, 2017 from http://www.nytimes.com/2007/08/22/technology/22google.html.

Collins, Shawn, YouTube Overlay Ads, dated Aug. 22, 2007, as evidenced by the sequence of screenshots attached as Collins—YouTube Screenshots Aug. 22, 2007 downloaded from https://www.youtube.com/watch?v=ZWFE9UDCPEE on Jun. 29, 2017.

Web banner, from Wikipedia, downloaded Apr. 23, 2015 from http://en.wikipedia.org/wiki/Standard_ad_size.

Web search engine, from Wikipedia, downloaded from http://en.wikipedia.org/wiki/Web_search_engine on Apr. 24, 2015.

Adobe Flash, from Wikipedia, downloaded from https://en.wikipedia.org/wiki/Adobe_Fiash on Dec. 22, 2015.

Pop-up ad, from Wikipedia, downloaded from https://en.wikipedia.org/iwki/Pop-up_ad on Dec. 28, 2015.

Actionscript, from Wikipedia, downloaded from https://en.wikipedia.org/wiki/ActionScript on Dec. 23, 2015.

Javascript, from Wikipedia, downloaded from https://en.wikipedia.org/wiki/JavaScript on Dec. 29, 2015.

ECMAscript, from Wikipedia, downloaded from https://en.wikipedia.org/wiki/ECMAScript on Dec. 29, 2015.

Cascading Style Sheets, from Wikipedia, dated Jun. 24, 2004, downloaded from https://en.wikipedia.org/w/index.php?title=Cascacing_Style_Sheets&oldid=221536895 on Jun. 7, 2016.

Mansfield, Richard, CSS Web Design for Dummies, excerpt downloaded Jun. 7, 2016 from http://www.dummies.com/howto/content/css-web-design-for-dummies-cheat-sheet.html.

CSS Web Design for Dummies:Book Information and Code Download- For Dummies, downloaded Jun. 7, 2016 from http://www.dummies.com/store/product!CSS-Web-Design-For-Dummies.productCd-0764584251.html.

Pop-up ad, from Wikipedia, downloaded from https://en.wikipedia.org/w/index.php?title=Pop-up_ad&oldid=2825978, dated Feb. 16, 2004, downloaded Jun. 6, 2016.

Macromedia Flash ActionScript 2.0 Language Reference, First Edition and Copyrights indicating 2005, downl.

* cited by examiner

DISPLAYING WEB PAGE ADVERTISEMENTS IN ONLINE VIDEO PLAYERS

CROSS REFERENCE TO RELATED APPLICATIONS

This application is a continuation of and claims the benefit of priority to U.S. Nonprovisional Patent application Ser. No. 16/408,254, filed on May 9, 2019, which is a continuation of and claims the benefit of priority to U.S. Nonprovisional patent application Ser. No. 12/491,191, filed Jun. 24, 2009, now U.S. Pat. No. 10,332,157, issued on Jun. 25, 2019, which claims the benefit of priority to U.S. Provisional Application No. 61/075,716, filed Jun. 25, 2008, all of which are incorporated herein by reference in their entireties.

BACKGROUND

1. Field of Art

The enclosed embodiments generally relate to online advertisements. More particularly, they relate to systems, methods, and computer-readable media for displaying web page advertisements within online video players.

2. Description of the Related Art

Recent growth in online video viewing has led to a desire to display advertisements in online video players. The cost of online video delivery is significant, and many online video publishers are hoping to earn revenue from the display of advertisements within the video player. An advantage of displaying advertisements inside the video player is that the advertisements are displayed at the center of a user's attention. Another advantage of displaying advertisements inside the video player is that behavior of the advertisements can be coordinated with playback of the video.

However, many advertisements are not in a suitable format for display in an online video player. Online video advertisements differ significantly from other advertising formats, such as the video advertisements displayed on television, or the graphical and sometimes interactive advertisements displayed on web pages. Further, industry standards have not evolved for the format of advertisements to be displayed in online video players. Because of these and other issues, there is not a large quantity of advertisements that are well-suited to display in online video players, referred to hereinafter as online video advertisements. In addition, ad sales companies are accustomed to delivery conventions which were designed for other formats, such as web banner advertisement.

Though the number of available online video advertisements is limited, there are large numbers of advertisements available today that have been designed for display in conventional web pages. An advertisement designed for display in a conventional web page but not in a format suitable for display in an online video player is referred to hereinafter as a web page advertisement. Many web page advertisements are available in standard formats. For example, the Internet Advertising Bureau (IAB) has defined a set of standard ad units for web page advertisements, including the popular 468×60 pixel banner and the 300×250 pixel rectangle. However, there currently is no way to display web page advertisements such as those in IAB standard formats in online video players.

A web page advertisement is conventionally a small software program which downloads and displays graphical elements to the user and possibly responds to user input, for example by opening a new web page on the user's mouse click. Many other specific inputs and responses are possible. Web page advertisements are conventionally written in programming languages such as hypertext markup language (HTML) or JavaScript (JS) and are designed to run on a conventional web browser. A conventional web browser is capable of running software programs that are written in Hypertext Markup Language (HTML), JavaScript (JS), Cascading Style Sheets (CSS), and related technologies, the collective set of which are referred to hereinafter as HTML/JS.

Conventionally, displaying a web page advertisement begins with the web browser processing a small piece of corresponding HTML/JS code, referred to hereinafter as an ad tag. The ad tag directs to the web browser to first communicate with one or more remote servers, sometimes downloading additional code for execution by the web browser. Based on the ad tag, the web browser generates an ad specification (ad spec) for the corresponding web page advertisement. The web browser displays the web page advertisement corresponding to the ad tag based on ad spec generated from the ad tag. The ad spec comprises one or more graphical elements for display as part of the web page. The ad spec can also include one or more behavioral specifications which determine actions to be taken by the web browser in response to user interaction with the web page advertisement (e.g., presenting an additional web page in response to a user click on the web page advertisement).

Typically, web page advertisements cannot be displayed in an online video player using the above-described techniques because the software for displaying them (e.g., the HTML/JS code included in the corresponding ad tags) is designed to run on a web browser, and is therefore not able to run on the platforms that online video players conventionally run on. For example, many online video players run on a multimedia platform such as the Adobe Flash platform. Conventional web page advertisements cannot run natively in a conventional multimedia platform such as Adobe Flash platform because such multimedia platforms do not provide the requisite functionality of a web browser.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1A:
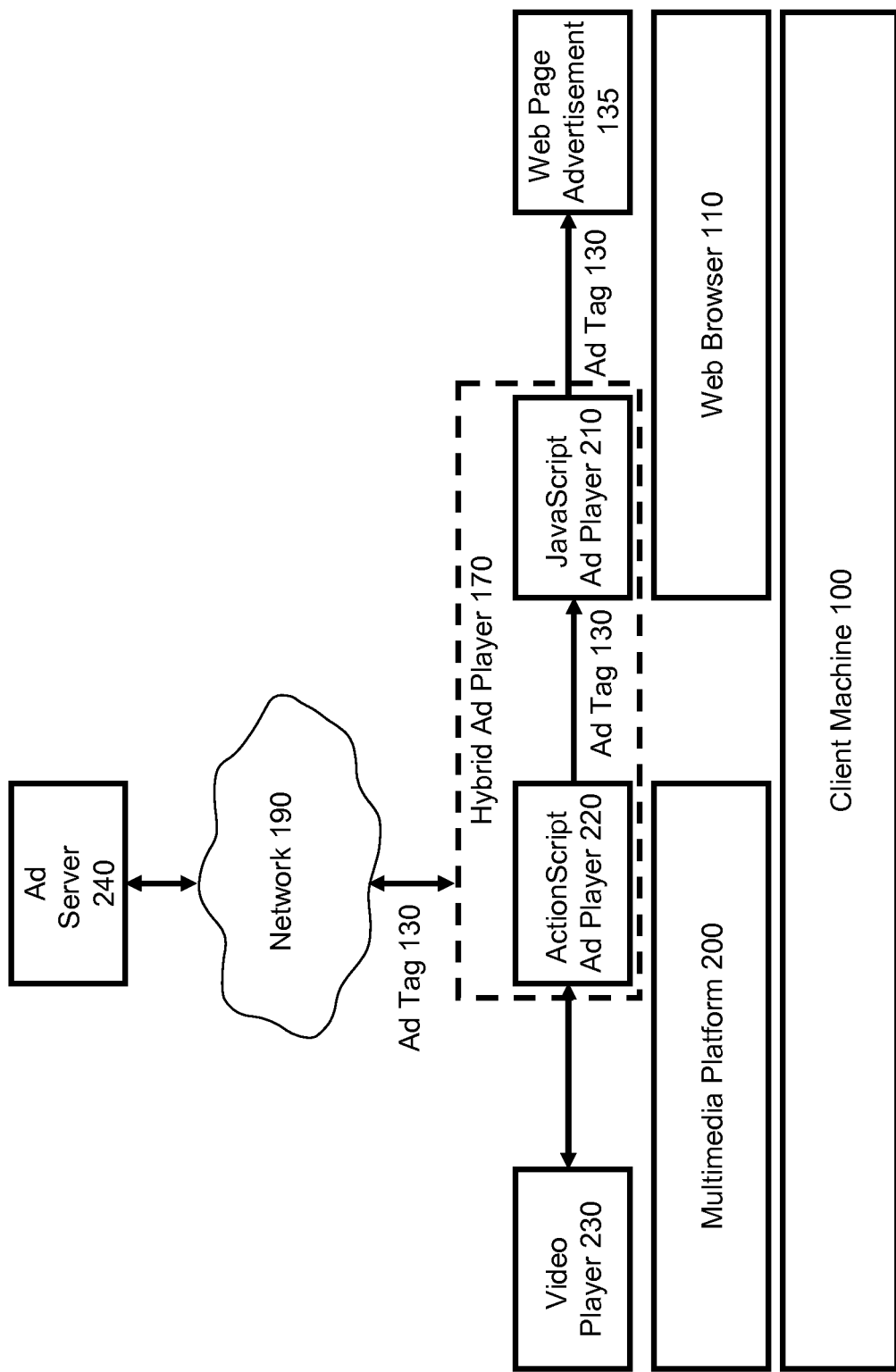
FIG. 1A illustrates the operation of a hybrid ad player system according to one embodiment.

The FIGS. (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed. For example, the disclosed embodiments may be implemented as one or more computer readable storage mediums encoded with one or more executable computer programs.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Overview

Systems and methods are disclosed for displaying a web page advertisement in a frame of an online video player included in a web page. As used herein, the frame of a video player refers to a spatial extent associated with the video player. The frame can comprise, for example, an on-screen spatial extent that is bounded by the outer perimeter of the video player. The frame can also comprise, for example, an on-screen spatial extent that is bounded by the outer perimeter of a video presented by the video player. In one embodiment, the ad player determines an identifier and a first location for the frame of the online video player. The first location is within a multimedia platform that executed the online video player. The ad player converts the determined first location for the frame of the online video player into a second location. The second location is within the web page. The ad player displays the web page advertisement in the web page such that the web page advertisement at least partially overlaps the second location. In one embodiment, the ad player comprises two or more portions (e.g., ad player components), including a first portion that interacts with the online video player and the multimedia platform and a second portion that interacts with a web browser and the web page. The first portion can comprise computer-executable instructions that are compatible with the multimedia platform and/or the online video player. The second portion can comprise computer-executable instructions that are compatible with the web browser and/or the web page.

As another embodiment, a system is described for displaying a web page advertisement in a frame of a video player executed by a multimedia platform. The system comprises an ad player that communicates with the video player and determines a location of the frame of the video player. The system also comprises a virtual web browser that converts an ad tag for the web page advertisement into an ad specification for the web page advertisement. The system also comprises an ad loader that presents the web page advertisement on the multimedia platform based on the ad specification such that the web page advertisement at least partially overlaps the determined location of the frame of the video player. The virtual web browser can run either on the multimedia platform or on a server device that is communicatively coupled to the multimedia platform.

In yet another embodiment, another system is described for displaying a web page advertisement in a frame of a video player executed by a multimedia platform. The system comprises an ad player that communicates with the video player and determines a location of the frame of the video player. The system also comprises an ad tag translator that converts an ad tag for the web page advertisement into a translated ad tag, the translated ad tag compatible with the multimedia platform, and converts the translated ad tag into a translated ad specification. The system also comprises an ad loader that presents the web page advertisement on the multimedia platform based on the translated ad specification such that the web page advertisement at least partially overlaps the determined location of the frame of the video player.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

Web Browser Techniques

Some systems and methods to display online advertisements in a video player involve a conventional web browser and are based on an advertisement display module, referred to hereinafter as an ad player, that comprises at least two portions (e.g., components) that communicate with each other. Such systems are referred to hereinafter as hybrid ad player systems. A first component of the hybrid ad player system runs on a multimedia platform and comprises computer-executable instructions that are compatible with the multimedia platform. A second component of the hybrid ad player system, referred to hereinafter as a JavaScript ad player (JS ad player), is written in HTML/JS and is executed by a conventional web browser.

FIG. 1A illustrates a computing environment for displaying a web page advertisement in an online video player using one embodiment of a hybrid ad player system. The system of FIG. 1A comprises a client machine 100 and an ad server 240 that are communicatively coupled via a network 190. In one embodiment, the ad server 240 is a conventional web server. The client machine 100 is a computer or other electronic device used by one or more users to perform activities including browsing web pages on the network 190. The client machine 100 can be, for example, a personal computer, personal digital assistant (PDA), or a mobile telephone. Only one ad server 240 and one client machine 100 are shown in FIG. 1A in order to simplify and clarify the description. Other embodiments can include any number of ad servers 240 and/or client machines 100 connected to the network 190.

The network 190 represents the communication pathways between (e.g., communicatively couples) the ad server 240 and the client machine 100. In one embodiment, the network 190 is the Internet. The network 190 can also include dedicated or private communications links that are not necessarily part of the Internet. In one embodiment, the network 190 uses standard communications technologies and/or protocols. Thus, the network 190 can include links using technologies such as Ethernet, 802.11, integrated services digital network (ISDN), digital subscriber line (DSL), asynchronous transfer mode (ATM), etc. Similarly, the networking protocols used on the network 190 can include the transmission control protocol/Internet protocol (TCP/IP), the hypertext transport protocol (HTTP), the simple mail transfer protocol (SMTP), the file transfer protocol (FTP), etc. The data exchanged over the network 190 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), secure HTTP (HTTPS), and/or virtual private networks (VPNs). The links or data can be compressed using compression technologies such as ZIP encoding. In another embodiment, the entities can use custom and/or dedicated data communications technologies instead of, or in addition to, the ones described above.

As shown in FIG. 1A, the client machine 100 executes a web browser 110 that allows a user to retrieve and view content from webpages and other computers on the network 190. The web browser 110 comprises computer-executable instructions stored in a computer-readable storage medium included in the client machine 100. When executed by a process included in the client machine 100, the web browser 110 allows the user to submit information to webpages and other computers on the network 190. In one embodiment, the web browser 110 is a conventional web browser, such as MICROSOFT INTERNET EXPLORER or MOZILLA FIREFOX. The web browser 110 is capable of running software programs that are written in Hypertext Markup Language (HTML), JavaScript (JS), Cascading Style Sheets (CSS), and related technologies, the collective set of which are referred to herein as HTML/JS. The web browser 110 can also support other scripting languages that allow the client machine 100 to perform actions in response to scripts and other data sent to the web browser 110 via the network 190.

The client machine 100 also executes a multimedia platform 200. In one embodiment, the multimedia platform 200 comprises computer-executable instructions stored in a computer-readable storage medium included in the client machine 100. When executed by a processor included in the client machine 100, the multimedia platform 200 provides a platform which supports the execution of multimedia files. In one embodiment, the multimedia platform 200 is the Adobe Flash platform.

The multimedia platform 200 executes a video player 230. The video player 230 can be any conventional video player 230 suitable for online video such as WINDOWS MEDIA PLAYER, REALPLAYER, QUICKTIME, WINAMP, or any number of custom video players 230 built to run on a suitable multimedia platform 200 such as the Adobe Flash platform. The video player 230 can be included in a containing web page (not shown). In such embodiments, although the web browser 110 presents the containing web page, the video player 230 is executed by the multimedia platform 220 to present one or more online videos.

A hybrid ad player 170 runs on the client machine 100. The hybrid ad player 170 comprises a first component that runs on the multimedia platform 200 and second component that runs on the web browser 110. In one embodiment, the multimedia platform 200 comprises the Adobe Flash platform and the first component of the hybrid ad player is an ActionScript ad player (AS ad player) 220 that is written using AS code. The second component, referred to herein as the JavaScript ad player (JS ad player) 210, is written in HTML/JS and runs in the web browser 110. The AS ad player 220 and the JS ad player 210 are communicatively coupled. In one embodiment, the players 210, 220 communicate with each other using "ExternalInterface", an AS to JS communication capability provided by one embodiment of the multimedia platform 200. Other technologies for AS to JS communication exist, such as fscommand, and the term ExternalInterface used herein refers to the collective set of technologies.

The ad server 240 sends an ad tag 130 to the client machine 100, where it is processed and transformed by the hybrid ad player 170 to generate and display a corresponding web page advertisement 135 in the frame of the video player 230. The frame can comprise, for example, an on-screen spatial extent that is bounded by an outer perimeter of the video player. The frame can also comprise, for example, an on-screen spatial extent that is bounded by an outer perimeter of a video presented by the video player. Either the AS ad player 220 or the JS ad player 210 can receive the ad tag 130. The AS ad player 220 can communicate with the video player 230 as both run on the multimedia platform 200. For example, the AS ad player 220 can coordinate the display of the web page advertisement 135 with the playback of a video presented by the video player 230. The JS ad player 210 communicates with the AS ad player 220 and presents the web page advertisement 135 via the web browser 110.

The AS ad player 220 identifies the location, size, and scaling of the frame of the video player 230 precisely, so that the hybrid ad player 170 can display the web page advertisement 135 within or near the video player 230 frame and with proper on-screen dimensions. In one embodiment, the frame of the video player 230 comprises an HTML DIV element surrounding the video player 230. The DIV element can have a conventionalized default identifier that the AS ad player 220 can recognize. The video player 230 can also pass the identifier of the DIV element to the AS ad player 220. Such naming flexibility allows for multiple JS ad players 210 (e.g., as part of multiple hybrid ad players 170) to coexist on a web page in some embodiments. For example, if there are multiple hybrid ad players 170 associated with a single web page that includes multiple video players 230, each hybrid ad player 170 can use a passed identifier to determine the DIV element corresponding to the frame of the video player 230 in which it is to display a web page advertisement 135.

In another embodiment, the AS ad player 220 automatically detects the name of the video player 230, for example by using AS calls which identify an internet URL location for the video player 230. The AS ad player 220 or the JS ad player 210 can then scan the containing web page for a unique or distinguished embedded multimedia (e.g., Flash) object corresponding to the identified URL location. Once the video player 230 is found, coordinates in the multimedia environment are mapped to coordinates in the containing web page environment. This can be done, for example, by configuring the AS ad player 220 to determine dimensional information such as the x and y coordinates, height and width, and scale factors of itself within the coordinate system of the video player 230, then transform the determined dimensional information into offsets relative to the HTML document object model (DOM) of the containing web page that includes the video player 230 (e.g., map dimensions of the AS ad player 220 from the coordinate system of the multimedia platform 200 to the coordinate system of the web browser 110).

The JS ad player 210 is configured to display the web page advertisement 135 over the frame of the video player 230, such that the web page advertisement 135 visually overlaps the frame when and where it is opaque, and that the frame is otherwise visible below the web page advertisement 135. Thus, in one embodiment the web page advertisement 135 is translucent or transparent. This can be accomplished, for example, by configuring the JS ad player 210 to position a DIV element over the embedded video player 230 object and use HTML and cascading style sheet (CSS) transparency and/or overflow clipping and hiding to fade or wipe the web page advertisement 135 onto the frame of the video player 230.

The JS ad player 210 is configured to animate the web page advertisement 135 on and off the frame of the video player 230. This can be accomplished via timer-driven gradual changes to relevant CSS properties of the HTML elements created by the JS ad player 210 to contain and animate the web page advertisement 135.

The JS ad player 210 is configured to receive information about the video playback from the AS ad player 220 so that it can time the web page advertisement 135 display properly. This can be accomplished by configuring the AS ad player 220 to retrieve video playback information from the video player 230 and relay the video playback information to the JS ad player via ExternalInterface or another suitable communication method.

The JS ad player 210 is also configured to send event messages to the AS ad player 220, so that the AS ad player 220 can communicate these event messages back to the video player 230 to affect video playback (e.g., pause the video playback when a user clicks the web page advertisement 135). This can be accomplished by linking user-interaction events (e.g., JS onclick or onrelease events) to video playback events detected and communicated by the AS ad player 220. It is noted that in some cases the JS ad player 210 further comprises a JS ad loader (not shown in FIG. 1A) which loads the ad tag 130 and informs the JS ad player 210 if loading has failed. A successful loading may, for example, comprise issuing one or more network requests through the web browser as specified by the ad tag 130. Such network requests can result in an ad spec or other visual ad assets (e.g., graphic elements included in the web page advertisement 135). Alternatively, a failed loading or can result in a failure to generate an ad spec or other visual ad assets. Loading of the ad tag 130 can be complicated by the fact that most ad tags 130 load in cross-domain contexts in which communication to and from JS elements is blocked, in which case failure of a loading cannot be communicated directly to the AS ad player 220 by either the JS ad player 210 or the JS ad loader. One option is to configure the JS ad player 210 to trigger the generation of a new AS ad player (not shown) upon a failure to load the ad tag 130. The new AS ad player passes the failure message to the main AS ad player 220. In some embodiments, this arrangement circumvents the JS cross-domain limitations because all AS ad players 220 running on the multimedia platform 200 can communicate with each other.

Full integration at both the AS and HTML/JS levels would comprise the video player 230 loading code for the AS ad player 220 and the containing web page loading code for the JS ad player 210. Some web page publishers may therefore find full integrations undesirable as it involves two load sequences. Thus, publishers of the containing web page may wish to integrate the containing web page with the hybrid ad player 170 at only the AS level, altering the video player 230 to load the AS ad player 220 but avoiding explicit changes to the containing web page that includes the video player 230. In such a scenario, the AS ad player 220 can then load the necessary JS code from the network 190, inject it into a JS virtual machine. Injection refers to a process whereby the JS code or a fragment thereof is passed from the AS ad player 220 to the web browser's 110 JS virtual machine using JS functional evaluation, and then the injected JS code bootstraps the necessary HTML DOM elements dynamically, adding all necessary elements to the web page at the time the hybrid ad player 170 or the web page advertisement 135 is loaded.

It is noted that in some embodiments web page advertisements 135 may be displayed in a video context that is in the original web page context. In such embodiments, ad impressions for a web page advertisement 135 are registered and billed when the web page advertisement 135 is loaded. To ensure that the web page advertisement 135 is not loaded too early, one solution is to preload each impression of the web page advertisement 135 only when the playback of the video presented by the video player 230 is about to reach a time for the web page advertisement 135 to be displayed.

Figure 1B:
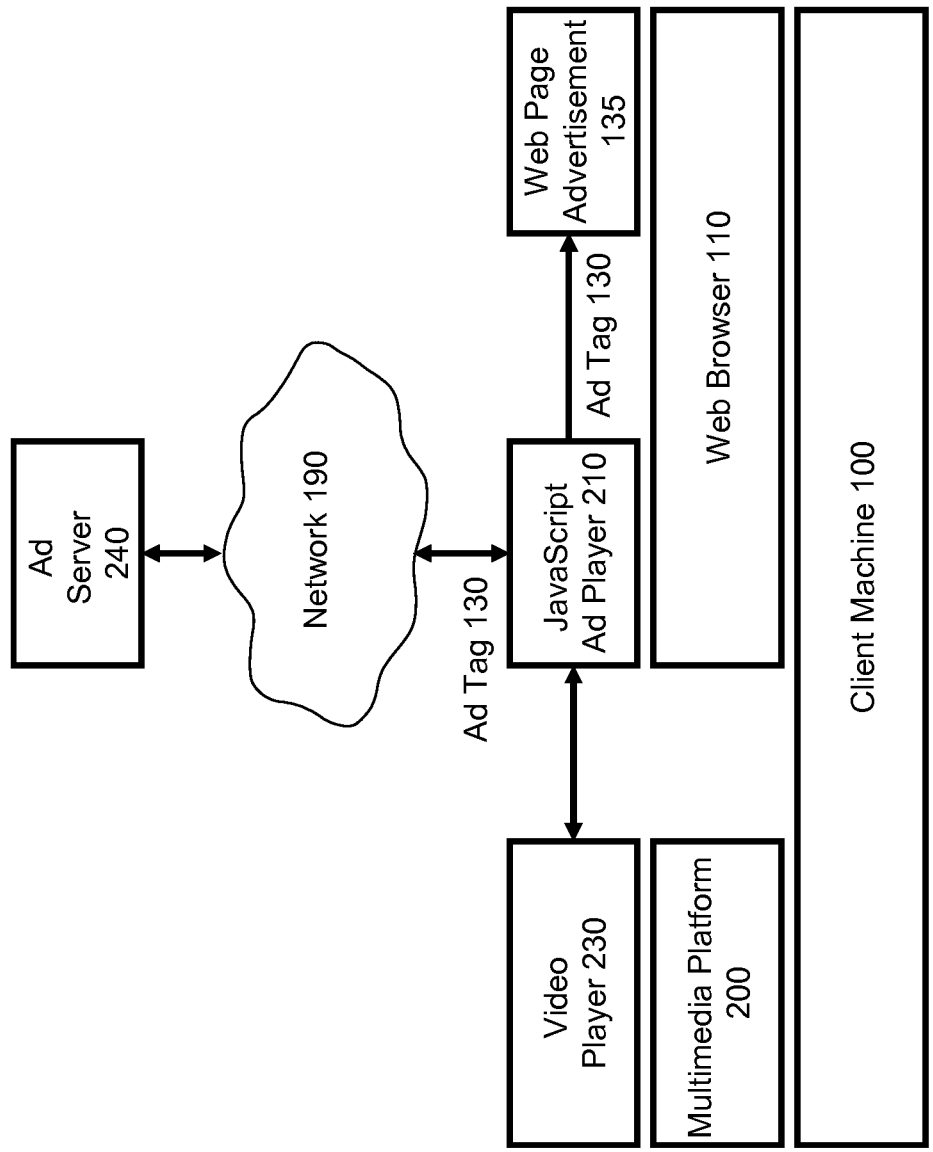
FIG. 1B illustrates the operation of a JavaScript ad player system according to one embodiment.

FIG. 1B illustrates a computing environment for displaying a web page advertisement 135 in an online video player using one embodiment of a JS ad player 210. The systems and methods illustrated by FIG. 1B are similar to those discussed above in reference to FIG. 1A, but do not involve and AS ad player 220. Rather, the JS ad player 210 displays the web page advertisement 135 over the video player 230 and then synchronizes display aspects of the web page advertisement 135 with the video player 230 by communicating directly with the video player 230, for example, through ExternalInterface. A HTML/JS method is used by the JS ad player 210 to interpret the ad tag 130 and respond to ad events such as animation, clicks, or closes. In embodiments of the system illustrated in FIG. 1B, the video player 230 interacts directly with the JS ad player 210 (e.g., using ExternalInterface), rather than utilizing an AS ad player 220 as an intermediary. All computer-executable instructions for requesting, displaying, and reporting on the web page advertisement 135 are implemented in JS as part of the JS ad player 210. The system of FIG. 1B can be enhanced by configuring the JS ad player 210 to determine contextual information at the time the web page is loaded rather than at video load time (which may be more delayed by network latency). An advantage of a JS ad player 210 system as illustrated in FIG. 1B is that the video player 230 can be an independent component and need not run on the multimedia platform 200.

Virtual Web Browser Techniques

There are situations in which the involvement of a web browser 110 is not an option (e.g., displaying web page advertisements 135 via the Adobe Media Player platform), but it is still desirable to display web page advertisements 135 or execute ad tags 130 which were designed to run in the context of a web browser 110. In such situations, systems and methods which are independent of a web browser 110 can be employed. Some embodiments simulate the behavior of a web browser 110, either on the ad server 240 or on the multimedia platform 200. A system simulating the behavior of a web browser 110 using the multimedia platform 200 is referred to herein as a client-side virtual web browser system. A system simulating the behavior of a web browser 110 on the ad server 240 is referred to herein as a server-side virtual web browser system. Both client-side virtual web browser systems and server-side virtual web browser systems have the advantage of not requiring the use of JS or any web browser 110 technology, and therefore can operate outside of a web browser context.

Figure 2A:
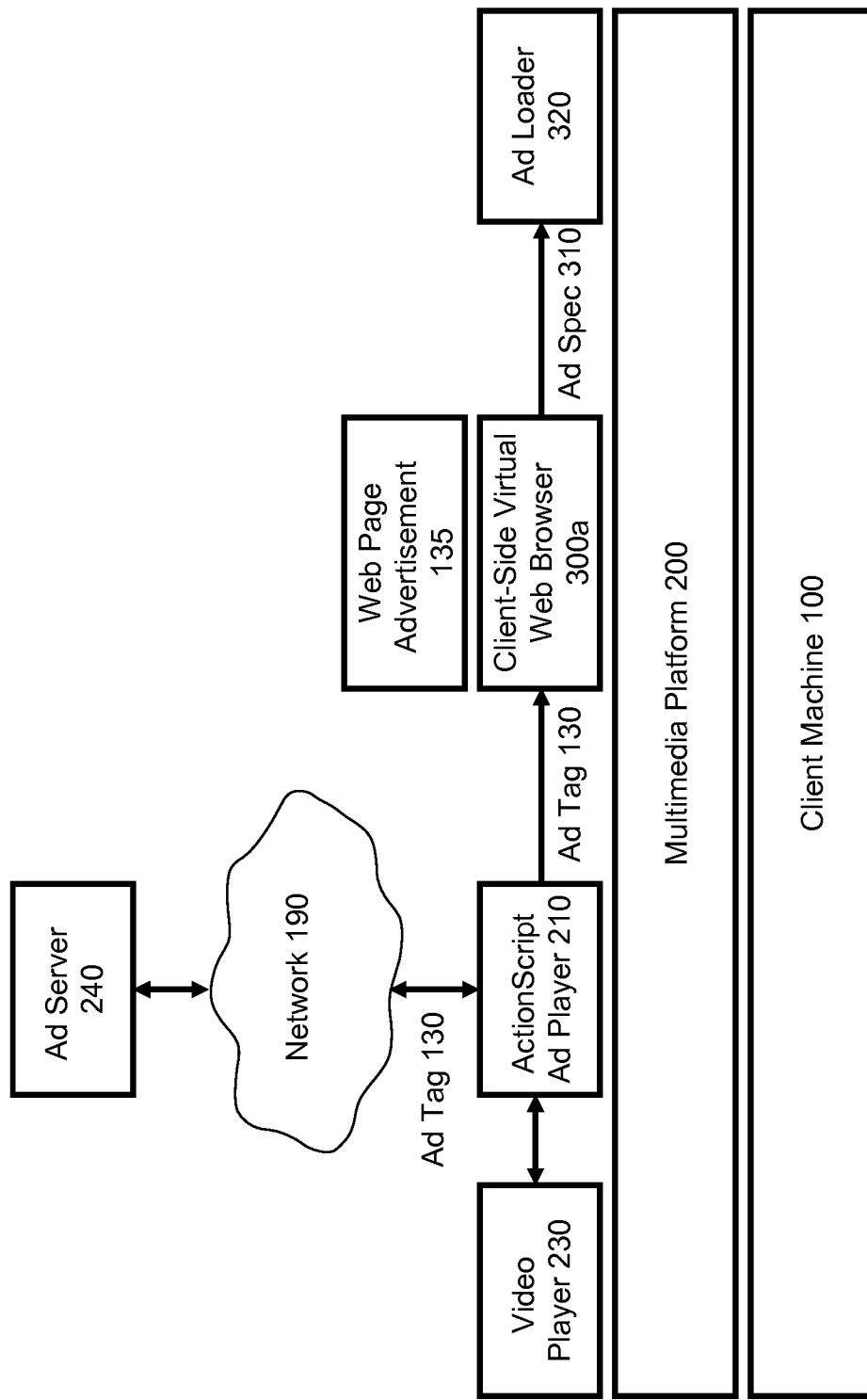
FIG. 2A illustrates the operation of a system for displaying a web page advertisement using a client-side virtual web browser according to one embodiment.

FIG. 2A illustrates the operation of one embodiment of system that includes a client-side virtual web browser 300a. As used herein, a virtual web browser is a system capable of executing one or more HTML/JS technologies, but whose primary purpose is not to actually display the resulting objects but rather to simulate certain computations typically performed by a conventional web browser 110. For example, a virtual web browser might construct DOM trees or layouts or execute scripts intended to execute in a web browser 110 context, but might not display objects as a result of such processing. Sometimes, a virtual web browser is capable of only a subset of the HTML/JS support that a full, conventional web browser 110 can perform. In addition, a virtual web browser may be a sub-object or sub-routine executed in the context of another application, such as an AS virtual machine. The system illustrated in FIG. 2A comprises the client machine 100 and the ad server 240. The client machine 100 and the ad server 240 are communicatively coupled by the network 190. The client machine 100 executes the multimedia platform 200 which supports, in addition to the video player 230 and the AS ad player 210, the client-side virtual web browser 300a and an ad loader 320.

The client-side virtual web browser 300a runs on the multimedia platform 200 and simulates the above-described web browser 110. The client-side virtual web browser 300a receives the ad tag 130 from the AS ad player 210 and executes the ad tag 130 to display the corresponding web page advertisement 135 using techniques similar to those described above as implemented by the web browser 110. The client-side virtual web browser 300a does not actually display the web page advertisement 135 on a screen viewable by the user, but instead outputs an ad specification (ad spec) 310 as further described below.

To output the ad spec 310, the client-side virtual web browser 300a executes a significant subset of the JS language. In one embodiment, the subset of the JS language includes string and arithmetic manipulation operators, basic control structures such as for loops, basic data structures such as arrays or lists, support via emulation of basic browser hooks such as document.write( ) accessors to the DOM tree, support via emulation of network file transfer and loading, support for evaluation, variable scoping, and similarly significant JS constructs. In one embodiment, because the JS code in the ad tag 130 can be configured to modify the DOM tree of the containing web page, the client-side virtual web browser 300a simulates the effect of the JS code in ad tag 130 on the DOM tree of a virtual web page, thereby enabling the JS code in the ad tag 130 to execute as designed. The client-side virtual web browser 300a also communicates with the ad server 240 via HTTP requests that appear to the ad server 240 as having been sent by a conventional web browser 110.

After executing the ad tag 130 to display the web page advertisement 135, the client-side virtual web browser 300a can export an ad spec 310 comprising graphic elements included in the web page advertisement 135 as well as basic behavior variables such as click URLs, mouseover URLs, video assets to play on mouseover, beaconing URLs for tracking or reporting purposes, and so on. Where the ad tag 130 is in HTML/JS and must be executed to fully create a visual ad object, the virtual web browser 300a encapsulates the results of such execution into an ad spec 310 which is interpretable by the ad loader 320; in some embodiments the resulting ad spec 310 is fully declarative, or even a simple key-value list. The ad spec 310 can then be loaded in the multimedia platform 200 by the ad loader 320 which handles the display, positioning, and/or user interaction features of the web page advertisement 135.

Figure 2B:
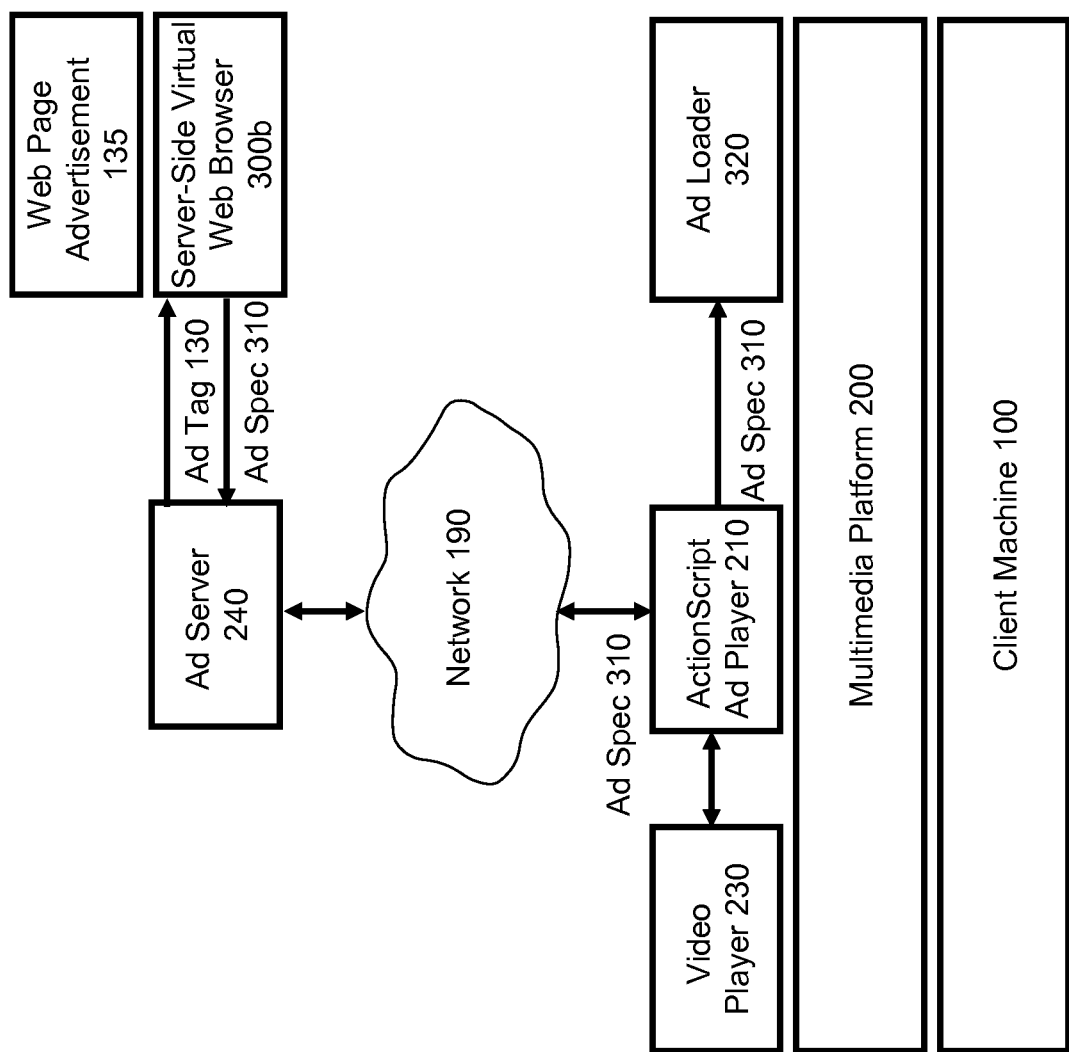
FIG. 2B illustrates the operation of a system for displaying a web page advertisement using a server-side virtual web browser according to one embodiment.

FIG. 2B illustrates the operation of a server-side virtual web browser 300b. In one embodiment, the server-side virtual web browser 300b runs on the ad server 240. In another embodiment, the server-side virtual web browser 300b runs a separate conventional server device that is communicatively coupled to the ad server 240 via the network 190. The server-side virtual web browser 300b receives the ad tag 130 from the ad server 240 and processes the ad tag 130 to generate an ad spec 310 for the web page advertisement 135 corresponding to the ad tag 130. In some embodiments, the web page advertisement 135 is a series of ad server 240 interactions and redirects which results in a payload of graphical and behavior elements (such as an image and click target) that are included in the generated ad spec 310.

The server-side virtual web-browser 300b transmits the ad spec 310 to the ad server 240. The ad server 240 then sends the ad spec 310 to the AS ad player 210 running on the multimedia platform 200 of the client machine 100. The multimedia platform 200 can then display the contents of the ad spec 310 to the user. The difficulties in this approach are very similar to those of the client-side virtual web browser. A key distinction between the system of FIG. 2B and the system of FIG. 2A is that the ad spec 310 is available on the ad server 240 and can be transmitted to the AS ad player 210 in place of the ad tag 130.

Ad Translation Techniques

In some embodiments, a web page advertisement 135 can be displayed in the online video player 230 by translating the ad tag 130 for the web page advertisement 135. Some embodiments translate HTML/JS code included in the ad tag 130 into another language, such JS or AS, and execute the translated ad tag 130 to display the corresponding web page advertisement 135. Translation of the ad tag 130 can be performed on the client machine 100, the ad server 240, or on a separate server that is communicatively coupled via the network 190. Both client-side and server-side ad tag 130 translation systems and accompanying methods are described in more detail below.

Figure 3A:
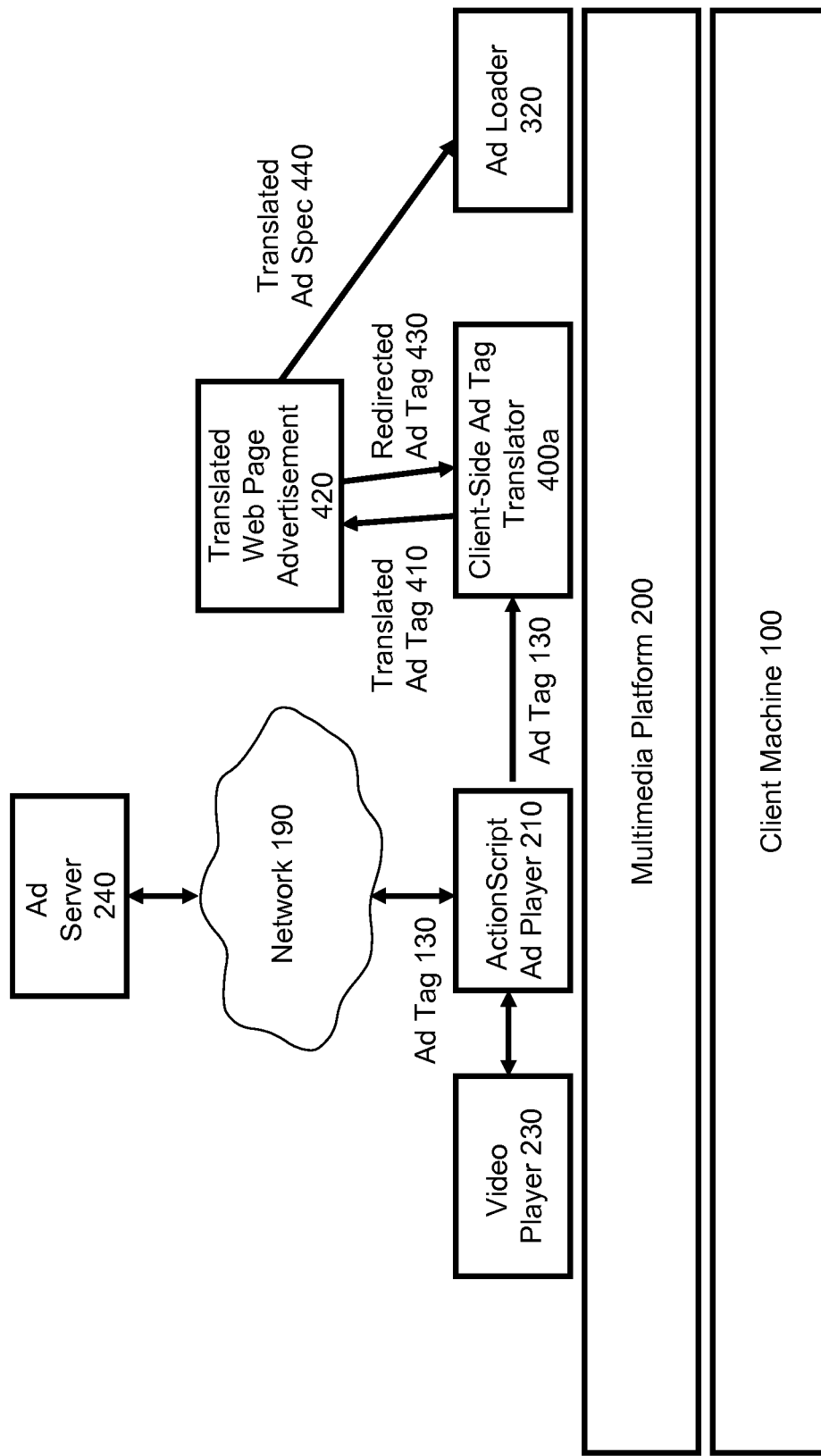
FIG. 3A illustrates the operation of a system for displaying a web page advertisement using a client-side ad tag translator according to one embodiment.

FIG. 3A shows a system that includes one embodiment of a client-side ad tag translator 400a. As shown in FIG. 3A, the client-side ad tag translator 400a runs on the multimedia platform 200 on the client machine 100. The client-side ad tag translator 400a inspects the ad tag 130 received by the AS ad player 210 from the ad server 240 and translates the received ad tag 130, transforming the received ad tag 130 into a translated ad tag 410 that comprises computer-executable code in a language compatible with the multimedia platform 200 (AS in one embodiment).

The client-side ad tag translator 400a performs computations upon the translated ad tag 410 identical or similar to the computations applied by the client-side virtual web browser 300a described above in reference to FIG. 2A. From such computations, the translator 400a generates a translated ad specification (translated ad spec) 440. In addition, such computations can generate new redirected ad tags 430 while processing the translated web page advertisement 420 corresponding to the translated ad tag 410. In some embodiments many rounds of translation may need to be performed by the client-side ad tag translator 400a before a translated ad spec 440 is generated from the translated web page advertisement 420. In one embodiment, the client-side ad tag translator 400a can be configured to recognize specific ad tags 130 and use specific manually-specified translations, or it may have one or more automated (e.g., in a just-in-time configuration) transcoding capabilities.

Figure 3B:
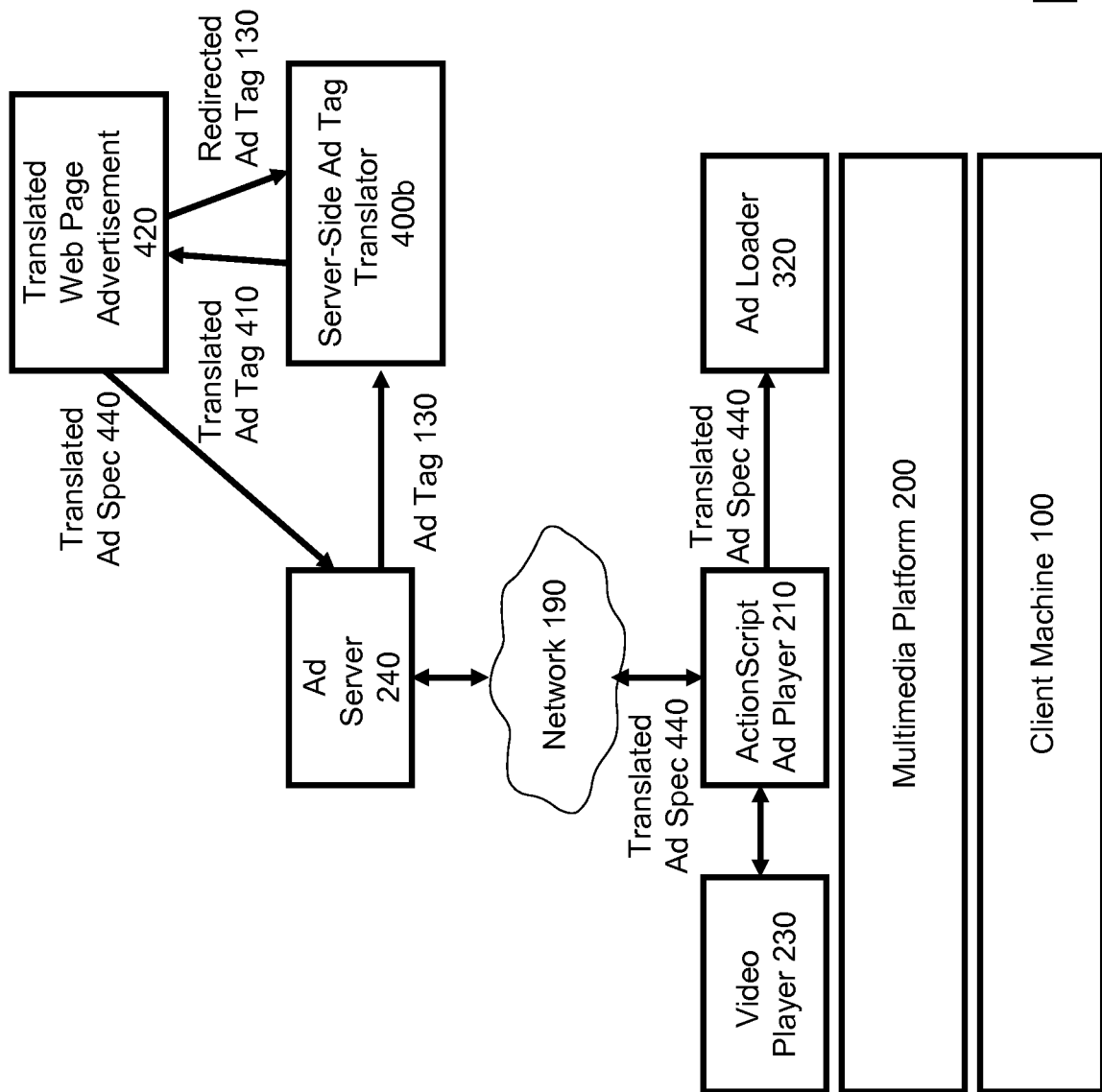
FIG. 3B illustrates the operation of a system for displaying a web page advertisement using a server-side ad tag translator according to one embodiment.

FIG. 3B shows a server-side ad tag translation system. In this case, the ad tag 130 provided by the ad server 240 is translated as the above-described system illustrated in FIG. 3A, but the translation of the ad tag 130 and execution of the translated ad tag 410 and the generation of the translated ad spec 440 are performed by a server-side ad tag translator 400*b*. The server-side ad tag translator 400*b* can be included in the ad server 240 or in another server device communicatively coupled to the network 190. The resulting translated ad spec 440 is then sent to the AS ad player 210 and forwarded to the ad loader 320 which renders and manage the translated ad spec 440.

Additional Server Considerations

For solutions where some portion of a web page advertisement 135 which was designed for a web browser executes on the ad server 240 or another server device, user cookie data can be managed so as to present the appearance to any remote servers on the network 190 that the web page advertisement 135 is loaded by an end user. Multiple techniques for managing user cookie data are possible. Either the cookies can be proxied from the user through the ad server 240 (with cookie information sent via an ad spec 310 or translated ad spec 440), or the user state can be maintained on the ad server 240 and/or connected services. In embodiments where a web browser 110 is no utilized, web cookies can also be encoded as cookies in a language compatible with the multimedia platform 200 (e.g., encoded as Flash cookies) and sent back and forth between the client machine 100 and the ad server 240.

ADDITIONAL CONSIDERATIONS

Portions of above descriptions in FIGS. 1A through 3B describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof. For example, the disclosed embodiments may be implemented as computer programs comprising instructions that can be stored on one or more computer readable storage mediums and such instructions are executable by a processor.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosed configurations. This description should be read to include one or at least one and the singular also includes the plural unless it is obvious that it is meant otherwise.

Upon reading this disclosure, those of skill in the art will appreciate still additional alternative structural and functional designs for a system and a process for displaying web page advertisements in a video player, for example, displaying IAB standard web page advertisements within the frame of a video player, through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for displaying a web page media content within a spatial extent associated with a video player of a device, the method comprising:
    receiving, at the device, a web page including an embedded multimedia object that identifies a location of a video to be played by the video player, and a Hypertext Markup Language ("HTML") element that identifies the spatial extent associated with the video player, wherein the device includes a hybrid player including (i) a first component that coordinates display of the web page media content with playback of the video by the video player, and (ii) a second component that presents the web page media content via a web browser of the device;
    generating, by the hybrid player, an HTML element to contain the web page media content and overlap the spatial extent; and
    displaying, by the hybrid player of the web browser, the web page media content using the generated HTML element.

2. The method of claim 1, wherein the web page media content is partially transparent by using HTML and cascading style sheet ("CSS") transparency.

3. The method of claim 1, further comprising:
   animating, by the hybrid player, the web page media content on to and off of the generated HTML element via a timer-driven gradual change to cascading style sheet ("CSS") properties of HTML elements.

4. The method of claim 1, wherein the hybrid player comprises a first portion, wherein the first portion of the hybrid player is configured to determine a first location of a frame of the video player.

5. The method of claim 4, wherein the first portion of the hybrid player is further configured to relay timing signals received from the video player.

6. The method of claim 1, wherein the hybrid player comprises a second portion, wherein the second portion of the hybrid player is configured to display the web page media content in the web page.

7. The method of claim 6, wherein the second portion of the hybrid player is further configured to modify properties of the web page media content in response to timing signals.

8. A system for displaying a web page media content within a spatial extent associated with a video player of a device, the system including:
   a data storage device that stores instructions for displaying the web page media content within the spatial extent associated with the video player; and
   a processor configured to execute the instructions to perform operations including:
      receiving, at the device, a web page including an embedded multimedia object that identifies a location of a video to be played by the video player, and a Hypertext Markup Language ("HTML") element that identifies the spatial extent associated with the video player, wherein the device includes a hybrid player including (i) a first component that coordinates the display of the web page media content with playback of the video by the video player, and (ii) a second component that presents the web page media content via the web browser of the device;
      generating, by the hybrid player, an HTML element to contain the web page media content and overlap the spatial extent; and
      displaying, by the hybrid player of the web browser, the web page media content using the generated HTML element.

9. The system of claim 8, wherein the web page media content is partially transparent by using HTML and cascading style sheet ("CSS") transparency.

10. The system of claim 8, wherein the processor is further configured to perform operations including:
    animating, by the hybrid player, the web page media content on to and off of the generated HTML element via a timer-driven gradual change to cascading style sheet ("CSS") properties of HTML elements.

11. The system of claim 8, wherein the hybrid player comprises a first portion, wherein the first portion of the hybrid player is configured to determine a first location of a frame of the video player.

12. The system of claim 11, wherein the first portion of the hybrid player is further configured to relay timing signals received from the video player.

13. The system of claim 8, wherein the hybrid player comprises a second portion, wherein the second portion of the hybrid player is configured to display the web page media content in the web page.

14. The system of claim 13, wherein the second portion of the hybrid player is further configured to modify properties of the web page media content in response to timing signals.

15. A non-transitory computer-readable medium storing instructions that, when executed by a computer, cause the computer to perform operations for displaying a web page media content within a spatial extent associated with a video player of a device, the operations including:
    receiving, at the device, a web page including an embedded multimedia object that identifies a location of a video to be played by the video player, and a Hypertext Markup Language ("HTML") element that identifies the spatial extent associated with the video player, wherein the device includes a hybrid player including (i) a first component that coordinates the display of the web page media content with playback of the video by the video player, and (ii) a second component that presents the web page media content via the web browser of the device;
    generating, by the hybrid player, an HTML element to contain the web page media content and overlap the spatial extent; and
    displaying, by the hybrid player of the web browser, the web page media content using the generated HTML element.

16. The computer-readable medium of claim 15, wherein the web page media content is partially transparent by using HTML and cascading style sheet ("CSS") transparency.

17. The computer-readable medium of claim 15, further comprising:
    animating, by the hybrid player, the web page media content on to and off of the generated HTML element via a timer-driven gradual change to cascading style sheet ("CSS") properties of HTML elements.

18. The computer-readable medium of claim 15, wherein the hybrid player comprises a first portion, wherein the first portion of the hybrid player is configured to determine a first location of a frame of the video player.

19. The computer-readable medium of claim 18, wherein the first portion of the hybrid player is further configured to relay timing signals received from the video player.

20. The computer-readable medium of claim 15, wherein the hybrid player comprises a second portion, wherein the second portion of the hybrid player is configured to display the web page media content in the web page.

* * * * *